United States Patent [19]
Sakai et al.

[11] Patent Number: 5,145,620
[45] Date of Patent: Sep. 8, 1992

[54] METHOD OF PRODUCING A SILICON NITRIDE SINTERED BODY

[75] Inventors: Hiroaki Sakai; Manabu Isomura, both of Nagoya, Japan

[73] Assignee: NGK Insulators, Ltd., Japan

[21] Appl. No.: 802,373

[22] Filed: Dec. 4, 1991

Related U.S. Application Data

[62] Division of Ser. No. 649,770, Jan. 25, 1991, Pat. No. 5,096,859.

[30] Foreign Application Priority Data

Feb. 9, 1990 [JP] Japan ............................. 2-28170
Nov. 30, 1990 [JP] Japan ............................ 2-330599

[51] Int. Cl.$^5$ ............................................. C04B 35/58
[52] U.S. Cl. ................................... 264/65; 419/13
[58] Field of Search ............... 501/92, 96, 98; 264/65; 419/13

[56] References Cited

U.S. PATENT DOCUMENTS

| | | | |
|---|---|---|---|
| 3,833,389 | 9/1974 | Komeya et al. | 501/98 |
| 3,969,125 | 7/1976 | Komeya et al. | 106/73.2 |
| 4,097,293 | 6/1978 | Komeya et al. | 106/43 |
| 4,184,882 | 1/1980 | Lange | 501/92 |
| 4,280,850 | 7/1981 | Smith et al. | 106/73.2 |
| 4,407,971 | 10/1983 | Komatsu et al. | 501/97 |
| 4,746,636 | 5/1988 | Yokoyama | 501/98 |
| 4,764,490 | 8/1988 | Yamakawa et al. | 501/98 |
| 4,777,155 | 10/1988 | Baba et al. | 501/92 |
| 4,795,724 | 1/1989 | Soma et al. | 501/98 |
| 4,833,108 | 5/1989 | Mizuno et al. | 501/98 |

Primary Examiner—James Derrington
Attorney, Agent, or Firm—Parkhurst, Wendel & Rossi

[57] ABSTRACT

A silicon nitride sintered body having a high strength at high temperatures as well as at room temperature can be provided by the method of the present invention, which includes preparing a raw material consisting of $Si_3N_4$ powder, a rare earth element oxide powder, and SiC powder, and at least one of a W compound powder and a Mo compound powder, forming the raw material into a shaped body, and then firing the shaped body in $N_2$ atmosphere to substantially crystallize the grain boundary phase of the $Si_3N_4$ grains. The silicon nitride sintered body includes $Si_3N_4$ as a main component, and the remainder of a rare earth element compound, SiC and at least one of a W compound and a Mo compound, the grain boundary phase of $Sio_3N_4$ grains consisting substantially of crystal phases. The silicon nitride sintered body is dense and thin in color so that uneven coloring thereof can be decreased.

4 Claims, 1 Drawing Sheet a: $\beta$-$Si_3N_4$
b: J phase
c: H phase
d: $WSi_2$
e: SiC

Diffraction Angle 2θ (degree)

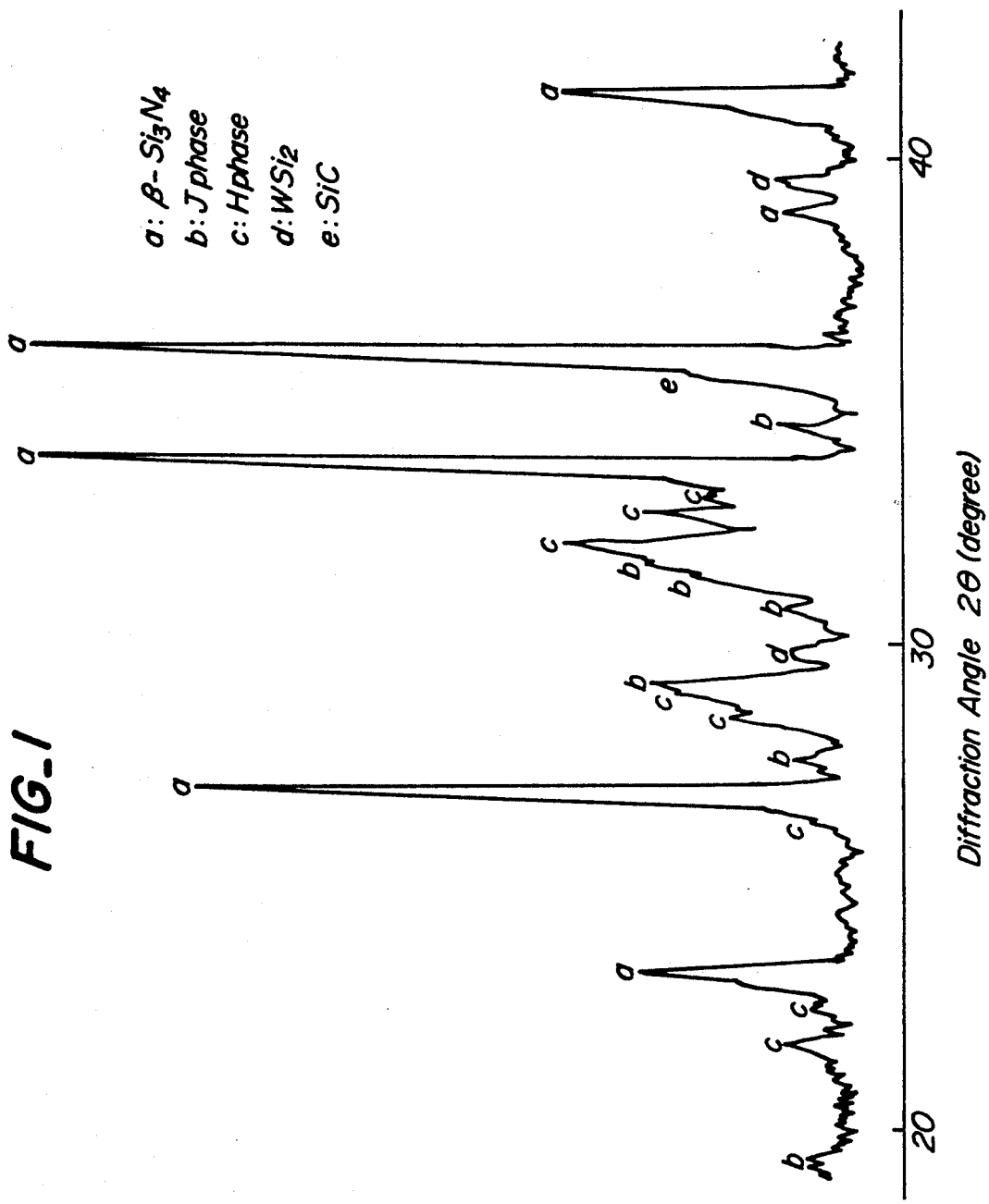

METHOD OF PRODUCING A SILICON NITRIDE SINTERED BODY

This is a division of application Ser. No. 07/649,770, filed Jan. 25, 1991, now U.S. Pat. No. 5,096,859.

BACKGROUND OF THE INVENTION

1. Field of the Invention

The present invention relates to silicon nitride sintered bodies having high strength at high temperatures, and a method of producing the same.

2. Related Art Statement

Heretofore, as a silicon nitride sintered body containing an oxide of a Group IIIa element including rare earth elements, a method of producing a sintered body has been disclosed wherein 85 mole % or more of $Si_3N_4$ is mixed with 15 mole % or less of at least one oxide of Group IIIa series elements, shaped, and sintered in a non-oxidizing atmosphere, as described in Japanese Patent publication No. 48-7,486. A and a silicon nitride sintered body has been disclosed which consists of at least 50 wt. % of $Si_3N_4$, not over than 50 wt. % of $Y_2O_3$ or at least one oxide of La series elements, and 0.01-20 wt. % of $Al_2O_3$, as described in Japanese Patent Publication No. 49-21,091.

However, there are problems in that the mere addition of a rare earth element to silicon nitride can not produce a silicon nitride sintered body having high strength at high temperatures, and that the addition of $Al_2O_3$ results in low softening point and hence remarkably decreased high temperature strength of the crystal grains boundary phase, though the addition of $Al_2O_3$ improves densification of the silicon nitride sintered body.

In order to solve the problem of high temperature strength, the applicant disclosed a technique in Japanese Patent Application Laid-open No. 63-100,067 wherein a desired composition and a desired quantity ratio of rare earth element is added to $Si_3N_4$ powder to specify the crystal phase of the sintered body so as to achieve high strength at high temperatures.

However, the silicon nitride sintered body disclosed in the Japanese Patent Application Laid-open No. 63-100,067 has a problem in that though it achieves high strength to certain extent at high temperatures the strength is inferior to room temperature strength thereof. This is considered due to a small amount of glass phase remaining in the composition even after the crystallization of the grain boundary phase. In order to decrease the remaining glass phase, a method may be considered of calculating the entire amount of oxygen contained in the raw materials of silicon nitride into $SiO_2$ amount by conversion, and enlarging the quantity ratio of rare earth element oxide to $SiO_2$ in the raw materials so as not to leave glass phase in the sintered body as far as possible. However, the method has a problem in that the densified sintered body is difficult to produce.

SUMMARY OF THE INVENTION

An object of the present invention is to obviate the above problems and to provide a silicon nitride sintered body having high strength at temperatures from room temperature to high temperatures as well as a method of producing the same.

The present invention is a silicon nitride sintered body consisting essentially of $Si_3N_4$ as a main component, and the remainder of a rare earth element compound, SiC and at least one of a W compound and a Mo compound, the grain boundary phase of $Si_3N_4$ grains consisting substantially of crystal phases.

The present invention is also a method of producing a silicon nitride sintered body, comprising, preparing a raw material consisting of $Si_3N_4$ powder, a rare earth element oxide powder, SiC powder, and at least one of a W compound powder and a Mo compound powder, forming the raw material into a shaped body, and then firing the shaped body in $N_2$ atmosphere to substantially crystallize the grain boundary phase of the $Si_3N_4$ grains.

The inventors have found out that in the above arrangement a silicon nitride sintered body having a $Si_3N_4$ crystal grain boundary phase consisting substantially of a crystal phase can be obtained by adding SiC, and a W compound such as WC, and/or a Mo compound such as $Mo_2C$ to a $Si_3N_4$ powder containing a desired rare earth element compound, such as rare earth element oxide, mixing, and firing the mixture in $N_2$ atmosphere. The silicon nitride sintered body can achieve high strength at temperatures from room temperature to high temperatures.

Namely, the addition of a W compound and/or a Mo compound functions with the rare earth element compound to accelerate the densification of the sintered body so as to mainly improve the strength at room temperature, while the addition of SiC is effective to accelerate the densification of the sintered body as well as the crystallization of the grain boundary phase so as to mainly improve the strength at high temperatures. The addition of SiC, and at least one of a W compound and a Mo compound functions synergistically to obtain a silicon nitride sintered body having high strength at temperatures from room temperature to high temperatures.

Also, the addition of a W compound and/or a Mo compound has an effect of decreasing the frequent peculiar coloring of the $Si_3N_4$ sintered body due to the addition of a rare earth element. Moreover, though the coloring of the sintered body due to a rare earth element is not preferable because the coloring changes when exposed to an oxygenic atmosphere, the color changing can be neglected owing to the decrease of the coloring due to the above effect. Furthermore, the addition of a W compound and/or a Mo compound functions synergistically with the addition of SiC to decrease uneven coloring of the sintered body even when the sintered body has a thick wall thickness.

BRIEF DESCRIPTION OF THE DRAWING

For a better understanding of the present invention, reference is made to the accompanying drawing, in which:

FIG. 1 is a characteristic graph of an X-ray diffraction pattern of an example of the silicon nitride sintered body of the present invention.

DESCRIPTION OF THE PREFERRED EMBODIMENTS

The amount of addition of the rare earth element oxide is preferably 2.7-10 mol %. If it is less than 2.7 mole %, a sufficient liquid phase for the densification of the sintered body can not be obtained, while if it exceeds 10 mole %, the densification can hardly be obtained even when SiC, and at least one of a W compound and a Mo compound are added to the $Si_3N_4$ powder containing a desired rare earth element compound. More preferably, it is 4.7-9 mole %. Generally, the optimum amount of the rare earth element oxide varies depending on the silicon nitride raw material used and is in a range of 2.7-10 mole %. Rare earth element oxide other than $Y_2O_3$ and $Yb_2O_3$, such as $Lu_2O_3$, $Tm_2O_3$ or $Er_2O_3$ may be used. Mole % used herein is calculated by rare earth element oxide mole/{rare earth element oxide mole + $Si_3N_4$ mole}.

As regards the raw material $Si_3N_4$, those having large $\alpha$ content is preferable from a viewpoint of sintering property. Desirably, oxygen content thereof is 1-3 wt. %.

The amount of addition of SiC is desirably in a range of 0.5-11 wt. % relative to the reciped amount of silicon nitride and rare earth element oxide. If it is less than 0.5 wt. %, a sufficient densification effect and crystallization acceleration effect can not be obtained. If it exceeds 11 wt. %, SiC prevents the densification of the sintered product. More preferable amount is 1-5 wt. %. Any SiC of $\alpha$ type, $\beta$ type or amorphous type may be used.

The amount of addition of a W compound and/or a Mo compound is desirably in a range of 0.5-3 wt. % relative to the reciped amount of silicon nitride and the rare earth element oxide. If it is less than 0.5 wt. %, a sufficient effect of improving the strength at room temperature can not be exhibited. A more preferable amount is 1-2 wt. %.

In the method of the present invention, at first a mixture of the raw material silicon nitride powder, SiC, and at least one of a W compound and a Mo compound is prepared. Then, the resultant mixture is formed to a desired shape to obtain a shaped body. The obtained shaped body is fired at 1,700°-2,100° C., preferably at 1,900°-2,000° C. in $N_2$ atmosphere under room pressure or under pressure, and crystallized by a temperature-decreasing process or a reheating treatment process.

Impurities, particularly cationic elements, such as Al, Fe, Mg, Ca, Na or K, in the raw materials to be used, desirably are not present in an amount of more than 0.5 wt. %, more preferably not more than 0.1 wt. %. Particle diameter of the raw materials is preferably as small as possible from a viewpoint of sintering property and desirably not more than 2 $\mu$m, more preferably not more than 1 $\mu$m.

Regarding the crystallization of the grain boundary phase, SiC has an effect of accelerating the crystallization of the grain boundary phase, so that the temperature-decreasing process can sufficiently crystallize the grain boundary phase, if the temperature-decreasing rate down to 1,000° C. is not more than 100° C./min. If the crystallization of the grain boundary phase is not sufficient due to a faster temperature-decreasing rate than the above or due to some other cause, a reheating treatment process may be effected to perform crystallization. Also, the reheating treatment process may be effected for a purpose of removing a residual stress in the sintered body, or the like purpose. The reheating treatment process is preferably effected at 1,300°-1,500° C. As a W compound and/or a Mo compound, WC or $Mo_2C$ is mentioned, but metallic W or Mo, silicides or oxides of W or Mo may also be used.

If the raw materials are heat treated at 1,000°-1,500° C. in an oxidizing atmosphere so as to form a surface layer substantially consisting of $SiO_2$ and a compound having a Re-Si-O structure (wherein Re represents a rare earth element) on the sintered body, the sintered body can exhibit a further high strength.

Hereinafter, the present invention will be explained in more detail with reference to examples.

EXAMPLE 1

The following materials are mixed in the ratios shown in Table 1 and ground in a wet mill: a raw material powder of silicon nitride having a purity of 97 wt. %, an impurities cationic elements (Al, Fe, Mg, Ca, Na and K) content of a sum of not more than 0.1 wt. %, an oxygen content of 2.2 wt. %, an average particle diameter of 0.6 $\mu$m, a BET specific surface area of 17 m$^2$/g, and an $\alpha$ content of 0.95; a rare earth element oxide having a purity of 99 wt. %, an average particle diameter of 0.3-2.0 $\mu$m, and characteristic properties as shown in Table 1; SiC having a purity of 99 wt. %, an average particle diameter of 0.4 $\mu$m, a BET specific surface area of 20 m$^2$/g; and either one of a W compound having a purity of 99 wt. %, an average particle diameter of 0.4-3 $\mu$m, and a BET specific surface area of 0.5-10 m$^2$/g and $Mo_2C$ having a purity of 99 wt. %, a particle diameter of 0.5-4 $\mu$m, and a BET specific surface area of 0.3-10 m$^2$/g. Then, water is removed from the ground mixture by evaporation, and the mixture is granulated to particles of a diameter of 150 $\mu$m to obtain a shaping powder. Thereafter, the shaping powder is formed into shaped bodies of 50×40×6 mm, and fired at firing conditions as shown in Table 1 to obtain silicon nitride sintered bodies of Nos. 1-20 of the present invention. SiC used in the sintered body is $\alpha$ type for No. 7, amorphous for No. 11, and $\beta$ type for the other sintered bodies. Also, the same raw materials are used and reciped in the reciping ratios as shown in Table 1, ground, granulated and formed in the same manner as described above, and fired at the firing conditions as shown in Table 1 to obtain silicon nitride sintered bodies of Nos. 21-32 of comparative examples. Temperature-decreasing rate at the firing is fundamentally 100° C./min down to 1,000° C., except for No. 9 which used a temperature-decreasing rate of 110° C./min from a heat treatment temperature of 1,400° C. for 6 hrs in nitrogen.

These sintered bodies are measured on relative density, crystal phases of grain boundary phase, and four-point bending strength at room temperature and 1,400° C. in the manners as described below, and the results are shown in Table 1.

Relative density of the sintered bodies is determined by measuring a bulk density of the sintered body based on the Archimedean principle, and calculating the ratio of the bulk density to the theoretical density of the sintered body. The theoretical density is calculated from the composition of the reciped powders and the densities of the reciped powders. The densities of the reciped powders are $Si_3N_4$: 3.2 g/cm$^3$, $Y_2O_3$: 4.8 g/cm$^3$, $Yb_2O_3$: 9.2 g/cm$^3$, $Tm_2O_3$: 8.8 g/cm$^3$, $Lu_2O_3$: 9.4 g/cm$^3$, $Er_2O_3$: 8.6 g/cm$^3$, SiC: 3.2 g/cm$^3$, WC: 15.7 g/cm$^3$, $Mo_2C$: 9.2 g/cm$^3$, W: 19.2 g/cm$^3$, Mo: 10.2 g/cm$^3$, $WO_3$: 7.2 g/cm$^3$, $MoO_3$: 4.7 g/cm$^3$, $WSi_2$: 9.4 g/cm$^3$, and $MoSi_2$: 6.3 g/cm$^3$.

Four-point bending strength is measured according to JIS R-1601 "Method of Testing a Bending Strength of Fine Ceramics".

Crystal phases of grain boundary phase are determined by an X-ray diffraction analysis using CuK $\alpha$-ray. In Table 1, J is a crystal of caspedian structure, H is a crystal of apatite structure, K is a crystal of wollastonite structure, L is $Ln_2SiO_3$ (Ln: rare earth element), and S is a crystal expressed by $Ln_2SiO_7$.

A result of an X-ray diffraction analysis of the silicon nitride sintered body of No. 6 of the present invention is shown in FIG. 1, wherein "a" represents b-$Si_3N_4$, "b" represents J phase which is a crystal of caspedian structure, "c" represents H phase which is a crystal of apatite structure, "d" represents $WSi_2$, and "e" represents β-SiC. As a result of chemical analyses of the sintered bodies, the chemical analyses coincided with compositions of the sintered bodies calculated from the reciping ratios of the raw materials.

TABLE 1

| | No. | Rare earth element oxide (wt %) | (mol %) | SiC (ratio, wt %) | W compound (ratio, wt %) | Mo compound (ratio, wt %) | Temperature (°C.) |
|---|---|---|---|---|---|---|---|
| Example | 1 | $Y_2O_3$:$Yb_2O_3$ = 2:4 | 2.7 | 2 | WC 1 | — | 1900 |
| | 2 | $Yb_2O_3$ = 15 | 5.9 | 3 | WC 1 | — | 1700 |
| | 3 | $Y_2O_3$ = 10 | 6.4 | 1 | WC 1 | — | 1950 |
| | 4 | $Y_2O_3$:$Yb_2O_3$ = 2:9 | 4.7 | 2 | WC 1 | — | 1900 |
| | 5 | $Y_2O_3$:$Yb_2O_3$ = 2:9 | 4.7 | 2 | — | $Mo_2C$ 1 | 2100 |
| | 6 | $Y_2O_3$:$Yb_2O_3$ = 3.4:14 | 7.8 | 5 | WC 1 | — | 1900 |
| | 7 | $Y_2O_3$:$Yb_2O_3$ = 3.4:14 | 7.8 | 2 | WC 1 | — | 2000 |
| | 8 | $Y_2O_3$:$Yb_2O_3$ = 3.9:16 | 9.0 | 2 | WC 1 | — | 1900 |
| | 9 | $Y_2O_3$:$Yb_2O_3$ = 4.2:17 | 10 | 2 | WC 0.5 | $Mo_2C$ 0.5 | 1900 |
| | 10 | $Y_2O_3$:$Tm_2O_3$ = 2:9 | 4.7 | 7 | — | $Mo_2C$ 1 | 1950 |
| | 11 | $Yb_2O_3$:$Lu_2O_3$ = 7:7 | 4.6 | 3 | WC 1 | — | 1900 |
| | 12 | $Y_2O_3$:$Er_2O_3$ = 2:3 | 6.6 | 1 | WC 1 | — | 1900 |
| | 13 | $Y_2O_3$ = 10 | 6.4 | 1 | W 1 | — | 1900 |
| | 14 | $Y_2O_3$:$Yb_2O_3$ = 3.4:14 | 7.8 | 2 | $WO_3$ 1 | — | 1900 |
| | 15 | $Y_2O_3$:$Yb_2O_3$ = 3.4:14 | 7.8 | 1 | $WO_3$ 3 | — | 1900 |
| | 16 | $Y_2O_3$:$Er_2O_3$ = 2:3 | 6.6 | 1 | $WSi_2$ 1 | — | 1950 |
| | 17 | $Yb_2O_3$ = 15 | 5.9 | 3 | — | Mo 2 | 1850 |
| | 18 | $Y_2O_3$:$Yb_2O_3$ = 3.4:14 | 7.8 | 2 | — | $MoO_3$ 1 | 1900 |
| | 19 | $Y_2O_3$:$Yb_2O_3$ = 3.4:14 | 7.8 | 2 | — | $MoO_3$ 3 | 1900 |
| | 20 | $Y_2O_3$:$Yb_2O_3$ = 4.2:17 | 10 | 2 | — | $MoSi_2$ 1 | 1950 |
| Comparative Example | 21 | $Y_2O_3$:$Yb_2O_3$ = 2:4 | 2.7 | 2 | — | — | 1900 |
| | 22 | $Yb_2O_3$ = 15 | 5.9 | — | — | $Mo_2C$ 1 | 1700 |
| | 23 | $Yb_2O_3$ = 10 | 6.4 | — | WC 1 | — | 1950 |
| | 24 | $Y_2O_3$:$Tm_2O_3$ = 2:9 | 4.7 | 7 | — | — | 1950 |
| | 25 | $Yb_2O_3$:$Lu_2O_3$ = 7:7 | 4.6 | 3 | — | — | 1900 |
| | 26 | $Y_2O_3$:$Er_2O_3$ = 2:3 | 6.6 | 1 | — | — | 1900 |
| | 27 | $Y_2O_3$ = 10 | 6.4 | — | W 1 | — | 1900 |
| | 28 | $Y_2O_3$:$Yb_2O_3$ = 3.4:14 | 7.8 | — | $WO_3$ 1 | — | 1900 |
| | 29 | $Y_2O_3$:$Er_2O_3$ = 2:3 | 6.6 | — | $WSi_2$ 1 | — | 1950 |
| | 30 | $Yb_2O_3$ = 15 | 5.9 | — | — | Mo 2 | 1850 |
| | 31 | $Y_2O_3$:$Yb_2O_3$ = 3.4:14 | 7.8 | — | — | $MoO_3$ 1 | 1900 |
| | 32 | $Y_2O_3$:$Yb_2O_3$ = 4.2:17 | 10 | — | — | $MoSi_2$ 1 | 1900 |

| | No. | Time (hr) | Pressure (atm) | Relative density (%) | Bending strength MPa room temp. | Bending strength MPa 1400° C. | Crystal phases other than $Si_3N_4$ |
|---|---|---|---|---|---|---|---|
| Example | 1 | 2 | 10 | 99 | 960 | 840 | H, L, S, $WSi_2$, SiC |
| | 2 | 3 | 1 | 99 | 960 | 840 | J, $WSi_2$, SiC |
| | 3 | 2 | 50 | 99 | 1000 | 850 | J, H, $WSi_2$, SiC |
| | 4 | 2 | 10 | 99 | 980 | 850 | H, J, $WSi_2$, SiC |
| | 5 | 2 | 100 | 99 | 970 | 850 | J, H, K, $MoSi_2$, SiC |
| | 6 | 2 | 10 | 99 | 990 | 860 | J, H, $WSi_2$, SiC |
| | 7 | 2 | 100 | 99 | 990 | 870 | J, $WSi_2$, SiC |
| | 8 | 2 | 10 | 99 | 980 | 860 | J, $WSi_2$, SiC |
| | 9 | 2 | 10 | 99 | 950 | 840 | J, $WSi_2$, $MoSi_2$, SiC |
| | 10 | 2 | 20 | 99 | 950 | 860 | H, L, $MoSi_2$, SiC |
| | 11 | 2 | 10 | 99 | 970 | 860 | J, $WSi_2$, SiC |
| | 12 | 2 | 10 | 99 | 980 | 860 | J, $WSi_2$, SiC |
| | 13 | 2 | 10 | 99 | 950 | 840 | J, H, $WSi_2$, SiC |
| | 14 | 2 | 10 | 99 | 990 | 870 | J, H, $WSi_2$, SiC |
| | 15 | 2 | 10 | 99 | 970 | 840 | J, H, $WSi_2$, SiC |
| | 16 | 2 | 50 | 99 | 980 | 860 | J, $WSi_2$, SiC |
| | 17 | 3 | 10 | 99 | 950 | 840 | J, $MoSi_2$, SiC |
| | 18 | 2 | 10 | 99 | 960 | 860 | J, H, $MoSi_2$, SiC |
| | 19 | 2 | 10 | 99 | 970 | 860 | J, H, $MoSi_2$, SiC |
| | 20 | 1 | 50 | 99 | 940 | 840 | J, H, $MoSi_2$, SiC |
| Comparative Example | 21 | 2 | 10 | 98 | 680 | 680 | L, S, SiC |
| | 22 | 3 | 1 | 97 | 780 | 770 | J, SiC |
| | 23 | 2 | 50 | 98 | 850 | 700 | J, H, $WSi_2$ |
| | 24 | 2 | 20 | 98 | 760 | 690 | H, L |
| | 25 | 2 | 10 | 98 | 780 | 780 | J |
| | 26 | 2 | 10 | 99 | 800 | 800 | J |
| | 27 | 2 | 10 | 99 | 810 | 700 | J, H, $WSi_2$ |
| | 28 | 2 | 10 | 99 | 840 | 710 | J, H, $WSi_2$ |
| | 29 | 2 | 50 | 99 | 830 | 690 | J, H, $WSi_2$ |
| | 30 | 3 | 10 | 99 | 810 | 710 | J, $MoSi_2$ |
| | 31 | 2 | 10 | 99 | 810 | 700 | J, H, $MoSi_2$ |

TABLE 1-continued

| | | | | | | |
|---|---|---|---|---|---|---|
| 32 | 1 | 10 | 99 | 820 | 680 | J, H, MoSi$_2$ |

J: cuspidine structure,
H: apatite structure,
K: wollastonite structure,
L: Re$_2$SiO$_5$ (Re: rare earth element)
S: Re$_2$Si$_2$O$_7$ (Re: rare earth element)

As clearly apparent from the above Table 1, the sintered bodies Nos. 1–20 containing a rare earth element oxide, SiC and at least one of a W compound and a Mo compound have high strength both at room temperature and 1,400° C. In contrast, the sintered bodies of Nos. 21 and 24–26 containing merely a rare earth element and SiC and the sintered bodies of Nos. 22, 23 and 27–32 containing merely a rare earth element and either one of a W compound and a Mo compound, have low strength.

EXAMPLE 2

The same raw materials as those of Example 1 are used and reciped in reciping ratios as described in Table 2, mixed and ground in a wet type mill. Thereafter, water is removed from the ground mixture by evaporation, and the mixture is granulated to particles of a diameter of 150 μm to obtain a shaping powder. Then, the shaping powder is formed into shaped bodies of a size of 50×40×6 mm, and fired at firing conditions as described in Table 2 to obtain the silicon nitride sintered bodies of Nos. 33–51 of the present invention. The silicon nitride sintered bodies of Nos. 48–51 are respectively heat treated in an oxidizing atmosphere at 1,000° C.×5 hrs, 1,200° C.×2 hrs, 1,300° C.×1 hr, or 1,500° C.×1 hr. Also, the same raw materials are used and reciped in the reciping ratios as shown in Table 2, ground, granulated and formed in the same manner as described above, and fired at the firing conditions as described in Table 2 to obtain silicon nitride sintered bodies of Nos. 52–55 of comparative examples. SiC used is β type. Temperature-decreasing rate from the firing temperature down to 1,000° C. is 100° C./min.

These sintered bodies are measured on bulk density, crystal phases and four-point bending strength at room temperature and 1,400° C. The results are shown in Table 2.

TABLE 2

| | No. | Rare earth element oxide (wt %) | (mol %) | SiC (ratio, wt %) | WC compound (ratio, wt %) | Mo$_2$C compound (ratio, wt %) | Temperature (°C.) |
|---|---|---|---|---|---|---|---|
| Example | 33 | Y$_2$O$_3$:Yb$_2$O$_3$ = 3.4:14 | 7.8 | 0.5 | 1 | — | 1900 |
| | 34 | Y$_2$O$_3$:Yb$_2$O$_3$ = 3.4:14 | 7.8 | 1 | 1 | — | 1900 |
| | 35 | Y$_2$O$_3$:Yb$_2$O$_3$ = 3.4:14 | 7.8 | 2 | 1 | — | 1900 |
| | 36 | Y$_2$O$_3$:Yb$_2$O$_3$ = 3.4:14 | 7.8 | 3 | 1 | — | 1900 |
| | 37 | Y$_2$O$_3$:Yb$_2$O$_3$ = 3.4:14 | 7.8 | 5 | 1 | — | 1900 |
| | 38 | Y$_2$O$_3$:Yb$_2$O$_3$ = 3.4:14 | 7.8 | 7 | 1 | — | 1900 |
| | 39 | Y$_2$O$_3$:Yb$_2$O$_3$ = 3.4:14 | 7.8 | 11 | 1 | — | 1900 |
| | 40 | Y$_2$O$_3$:Yb$_2$O$_3$ = 3.4:14 | 7.8 | 11 | 1 | — | 1900 |
| | 41 | Y$_2$O$_3$:Yb$_2$O$_3$ = 3.4:14 | 7.8 | 2 | 0.5 | — | 1900 |
| | 42 | Y$_2$O$_3$:Yb$_2$O$_3$ = 3.4:14 | 7.8 | 2 | 1.5 | — | 1900 |
| | 43 | Y$_2$O$_3$:Yb$_2$O$_3$ = 3.4:14 | 7.8 | 2 | 2 | — | 1900 |
| | 44 | Y$_2$O$_3$:Yb$_2$O$_3$ = 3.4:14 | 7.8 | 2 | 3 | — | 1900 |
| | 45 | Y$_2$O$_3$:Yb$_2$O$_3$ = 3.4:14 | 7.8 | 1 | — | 1 | 1900 |
| | 46 | Y$_2$O$_3$:Yb$_2$O$_3$ = 3.4:14 | 7.8 | 3 | — | 1 | 1900 |
| | 47 | Y$_2$O$_3$:Yb$_2$O$_3$ = 3.4:14 | 7.8 | 2 | — | 1.5 | 1900 |
| | 48 | Y$_2$O$_3$:Yb$_2$O$_3$ = 3.4:14 | 7.8 | 2 | 1 | — | 1900 |
| | 49 | Y$_2$O$_3$:Yb$_2$O$_3$ = 3.4:14 | 7.8 | 2 | 1 | — | 1900 |
| | 50 | Y$_2$O$_3$:Yb$_2$O$_3$ = 3.4:14 | 7.8 | 2 | 1 | — | 1900 |
| | 51 | Y$_2$O$_3$:Yb$_2$O$_3$ = 3.4:14 | 7.8 | 2 | — | 1 | 1900 |
| Comparative Example | 52 | Y$_2$O$_3$:Yb$_2$O$_3$ = 3.4:14 | 7.8 | 1 | — | — | 1900 |
| | 53 | Y$_2$O$_3$:Yb$_2$O$_3$ = 3.4:14 | 7.8 | — | 1 | — | 1900 |
| | 54 | Y$_2$O$_3$:Yb$_2$O$_3$ = 3.4:14 | 7.8 | — | — | 1 | 1900 |
| | 55 | Y$_2$O$_3$:Yb$_2$O$_3$ = 3.4:14 | 7.8 | — | 0.5 | 0.5 | 1900 |

| | No. | Time (hr) | Pressure (atm) | Relative density (%) | Bending strength MPa room temp. | Bending strength MPa 1400° C. | Crystal phases other than Si$_3$N$_4$ | Surface crystal phase |
|---|---|---|---|---|---|---|---|---|
| Example | 33 | 2 | 10 | 99 | 940 | 840 | J, H, WSi$_2$, SiC | — |
| | 34 | 2 | 10 | 99 | 970 | 860 | J, H, WSi$_2$, SiC | — |
| | 35 | 2 | 10 | 99 | 1000 | 870 | J, H, WSi$_2$, SiC | — |
| | 36 | 2 | 10 | 99 | 1000 | 870 | J, H, WSi$_2$, SiC | — |
| | 37 | 2 | 10 | 99 | 990 | 860 | J, H, WSi$_2$, SiC | — |
| | 38 | 2 | 10 | 99 | 940 | 840 | J, H, WSi$_2$, SiC | — |
| | 39 | 2 | 10 | 99 | 930 | 830 | J, H, WSi$_2$, SiC | — |
| | 40 | 4 | 10 | 99 | 940 | 840 | J, H, WSi$_2$, SiC | — |
| | 41 | 2 | 10 | 99 | 930 | 840 | J, H, WSi$_2$, SiC | — |
| | 42 | 2 | 10 | 99 | 990 | 870 | J, H, WSi$_2$, SiC | — |
| | 43 | 2 | 10 | 99 | 990 | 860 | J, H, WSi$_2$, SiC | — |
| | 44 | 2 | 10 | 99 | 950 | 840 | J, H, WSi$_2$, SiC | — |
| | 45 | 2 | 10 | 99 | 950 | 860 | J, H, MoSi$_2$, SiC | — |
| | 46 | 2 | 10 | 99 | 950 | 860 | J, H, MoSi$_2$, SiC | — |
| | 47 | 2 | 10 | 99 | 950 | 860 | J, H, MoSi$_2$, SiC | — |
| | 48 | 2 | 10 | 99 | 1020 | 880 | J, H, WSi$_2$, SiC | S, L |

TABLE 2-continued

|  |  |  |  |  |  |  |  |  |
|---|---|---|---|---|---|---|---|---|
|  | 49 | 2 | 10 | 99 | 1030 | 880 | J, H, WSi$_2$, SiC | S, L, SiO$_2$ |
|  | 50 | 2 | 10 | 99 | 1030 | 890 | J, H, WSi$_2$, SiC | S, L, SiO$_2$ |
|  | 51 | 2 | 10 | 99 | 1020 | 880 | J, H, MoSi$_2$, SiC | S, L, SiO$_2$ |
| Compar- | 52 | 2 | 10 | 99 | 810 | 810 | J, H, SiC | — |
| ative | 53 | 2 | 10 | 99 | 860 | 690 | J, H, WSi$_2$ | — |
| Example | 54 | 2 | 10 | 99 | 860 | 700 | J, H, MoSi$_2$ | — |
|  | 55 | 2 | 10 | 99 | 860 | 690 | J, H, WSi$_2$, MoSi$_2$ | — |

J: cuspidine structure,
H: apatite structure,
K: wollastonite structure,
L: Re$_2$SiO$_5$ (Re: rare earth element)
S: Re$_2$Si$_2$O$_7$ (Re: rare earth element)

As clearly apparent from the above Table 2, the effect of addition of WC or Mo$_2$C is respectively seen particularly in the increase of strength of the sintered bodies at room temperature, viewed from a comparison of Example No. 34 and Comparative Example No. 52 and a comparison of Example No. 45 and Comparative Example No. 52.

As apparent from the foregoing explanations, according to the method of producing a silicon nitride sintered body of the present invention, SiC and at least one of a W compound and a Mo compound are added to Si$_3$N$_4$ powder containing a desired rare earth element oxide, and fired in N$_2$ atmosphere, so that the grain boundary phase of Si$_3$N$_4$ grains can be substantially made of crystal phases and hence a silicon nitride sintered body can be obtained having a high strength at temperatures from room temperature to high temperatures.

Although the present invention has been explained with reference to specific examples and numerical values, it will be of course apparent to those skilled in the art that various changes and modifications thereof are possible without departing from the broad aspect and scope of the present invention as defined in the appended claims.

What is claimed is:

1. A method of producing a silicon nitride sintered body containing Si$_3$N$_4$ grains comprising the steps of: preparing a raw material consisting essentially of
    a) Si$_3$N$_4$ powder as a main component,
    b) 2.7-10 mol % of a rare earth element compound powder, calculated as an oxide of the rare earth element relative to a sum of mol % of Si$_3$N$_4$ and mol % of the rare earth element compound calculated as an oxide of the rare earth element,
    c) 0.5-11 wt. % SiC powder relative to a sum of Si$_3$N$_4$ and the rare earth element compound calculated as an oxide of the rare earth element, and
    d) 0.5-3 wt. % of at least one of a W compound powder or metallic W and a Mo compound powder 14 or metallic Mo relative to a sum of Si$_3$N$_4$ and the rare earth element compound calculated as an oxide of the rare earth element;
forming the raw material into a shaped body; and
firing the shaped body at 1,700°-2,100° C. in N$_2$ atmosphere to substantially crystallize a grain boundary phase of the Si$_3$N$_4$ grains.

2. The method of claim 1, wherein the rare earth element of said rare earth element compound is selected from the group consisting of Y and Yb.

3. The method of claim 1, wherein said W compound is at least one compound selected from the group consisting of carbides of W, oxides of W, and silicides of W, and said Mo compound is at least one compound selected from the group consisting of carbides of Mo, oxides of Mo, and silicides of Mo.

4. The method of claim 1, wherein said shaped body is fired at 1,900°-2,000° C.

* * * * *